US008694180B2

(12) United States Patent
Glassl et al.

(10) Patent No.: US 8,694,180 B2
(45) Date of Patent: Apr. 8, 2014

(54) METHOD AND SYSTEM FOR AN OPTIMIZED UTILIZATION OF ENERGY RESOURCES OF AN ELECTRICAL SYSTEM

(75) Inventors: Matthias Glassl, Donauwörth (DE); Wolfgang Kreitmair-Steck, Ottobrunn (DE); Mustapha Ennaji, München (DE); Thorsten Koenemann, Donauwörth (DE)

(73) Assignee: Airbus Helicopters Deutschland GmbH, Donawoerth (DE)

( * ) Notice: Subject to any disclaimer, the term of this patent is extended or adjusted under 35 U.S.C. 154(b) by 328 days.

(21) Appl. No.: 13/012,905

(22) Filed: Jan. 25, 2011

(65) Prior Publication Data

US 2011/0190963 A1 Aug. 4, 2011

(30) Foreign Application Priority Data

Jan. 29, 2010 (EP) .................... 10400012

(51) Int. Cl.
*G06F 7/00* (2006.01)
*G06F 17/00* (2006.01)

(52) U.S. Cl.
USPC ................................ 701/3; 701/99

(58) Field of Classification Search
USPC ........... 701/3, 22, 29.2, 99; 244/17.11, 17.13, 244/53 R
See application file for complete search history.

(56) References Cited

U.S. PATENT DOCUMENTS

| 2007/0205745 | A1 | 9/2007 | Chen |
| 2008/0217471 | A1 | 9/2008 | Liu |
| 2008/0306637 | A1* | 12/2008 | Borumand et al. ............... 701/3 |
| 2009/0302153 | A1 | 12/2009 | Matasso et al. |
| 2010/0023239 | A1 | 1/2010 | Self |
| 2010/0057511 | A1* | 3/2010 | Mansouri et al. ............... 701/29 |
| 2011/0071705 | A1* | 3/2011 | Matuszeski et al. .............. 701/3 |

FOREIGN PATENT DOCUMENTS

| DE | 10306946 A1 | 9/2004 |
| EP | 1626322 A1 | 2/2006 |
| WO | 2007009675 A1 | 1/2007 |

OTHER PUBLICATIONS

Search Report and Written Opinion; Application No. EP 10400012 dated: Sep. 29, 2010.
EPO Communication pursuant to Article 94(3) EPC for corresponding EP Application No. 10 400 012.0, dated Dec. 9, 2011.

* cited by examiner

*Primary Examiner* — Thomas Tarcza
*Assistant Examiner* — Kevin Myhre
(74) *Attorney, Agent, or Firm* — Brooks Kushman P.C.

(57) ABSTRACT

A method for optimized utilization of available energy resources/sources (3) of an electrical system such as for a vehicle generator system. The steps include: determining performance parameters $L_{Ist}$ (e.g. current I, voltage U, temperature T, power $P_D$ ($P_{verlust}$), $P_E$ ($P_{wirk}$), efficiency, etc.) of a preferred energy resource (3); entering performance parameters $L_{Ist}$ (current I, voltage U, temperature T, altitude of the vehicle, etc.) of the energy resource (3) into a thermal model (7); comparing a performance parameter $L_{Ist}$ of the energy resource (3) with a specified performance limit parameter $L_{Soll}$ at a specified threshold level; determining a value for an energy reservoir $E_{Rest}$ of a preferred energy resource (3); and to calculate a remaining time $T_{Max}$ depending on the energy reservoir $E_{Rest}$ of a preferred energy resource (3) and using the one or more identified performance parameters $L_{Ist}$ to maintain an operational state of the vehicle.

15 Claims, 1 Drawing Sheet

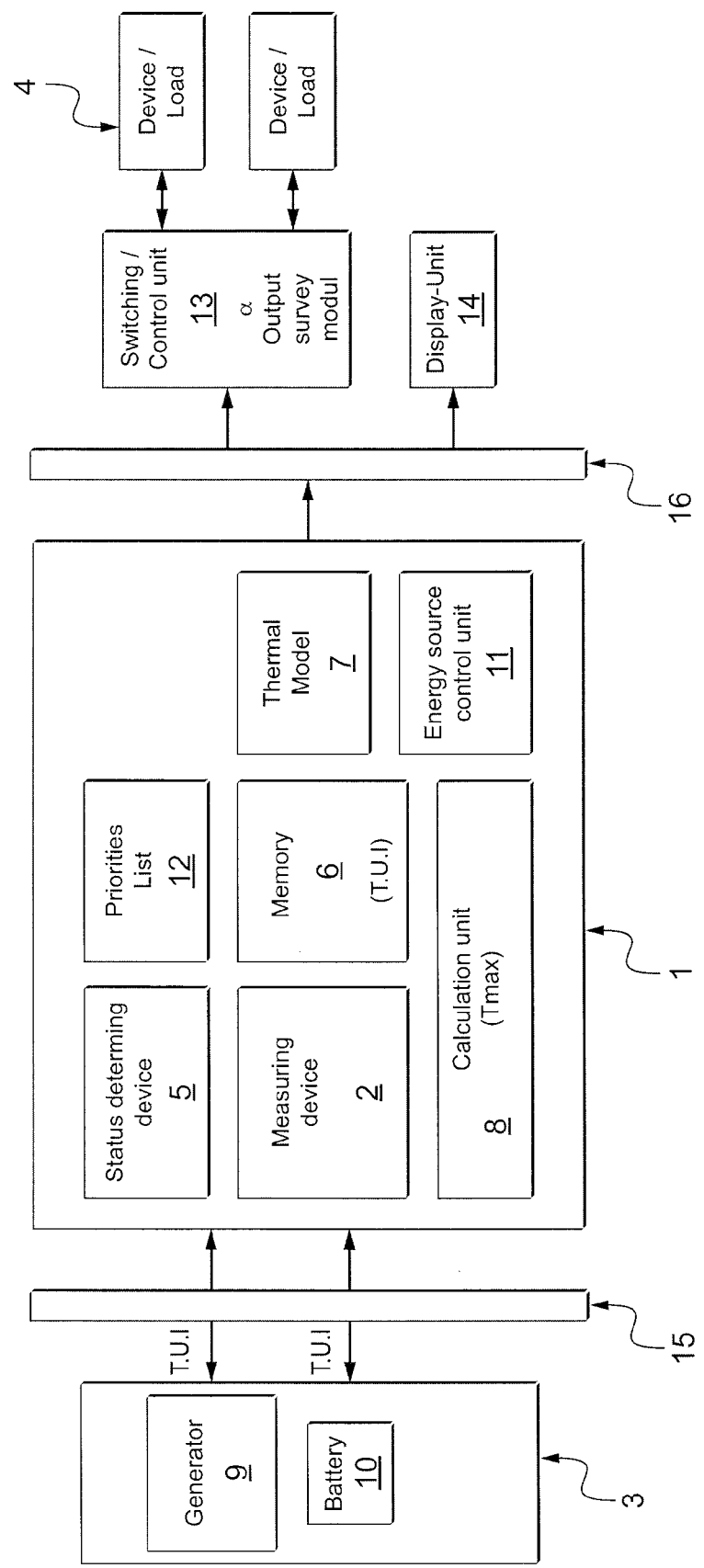

METHOD AND SYSTEM FOR AN OPTIMIZED UTILIZATION OF ENERGY RESOURCES OF AN ELECTRICAL SYSTEM

CROSS REFERENCE TO RELATED APPLICATIONS

This application claims the benefit of European patent application no. EP 10 400 012.0 filed on Jan. 29, 2010, the disclosure of which is incorporated in its entirety by reference herein.

FIELD OF THE INVENTION

The present invention relates to the technical field of energy management for electrical systems. Here, it is possible to register when a defined maximum power limit of the connected power resources/sources is exceeded and, if necessary, shut down prioritized devices, i.e. disconnect them from the network, in order to protect the power source from damage. The decisive criterion for potentially shutting down devices is an increase in temperature in a power source which is detected for every connected device.

In the following the terms "power source", "power resource", "source", "energy resource" and "energy source" are used as synonyms and have therefore the same meaning. A power source can be an electrical source, but must not be limited to an electrical source.

For every power source, the expected temperature increase is calculated by means of a thermal model in order to determine from this the time sequence T(t) or the sequence of the progressive heating of each of the components which can constitute a power source (forecast of the temperature development of the components to be protected).

The present invention generally finds its application in the field of aviation and aerospace and particularly helicopters.

BACKGROUND OF THE INVENTION

In the state of the art, systems for optimized power distribution are known. The publication US 2008/0217471 A1, for example, describes systems for distributing power, whereby the operational state of the loads/devices connected to the network are monitored by querying the parameters of the respective devices. If a device is outside of its normal operational state, the system has the possibility of disconnecting this device from the network, by reducing or even fully cutting off the power supply to the device in question.

The systems described are limited to identifying the operational state of each device connected to the system on the basis of signal parameters, such as current and voltage, which are sent to the devices by a control unit, and then taking appropriate measures if the device demonstrates abnormal operating behaviour. Information about the operational state of a power supply source which is supplying the device cannot or can only indirectly be derived from this.

The disadvantage of the known systems is that the upper limits of a power source cannot be fully utilized due to the lack of knowledge about its status. Retrieving the status of each individual device is relatively complex, however, from the point of view of the circuit. A device is generally shut down as soon as it reaches a critical operational state.

A utilization of the upper limits of the available power resources/sources in order to initially avoid the disconnection or prioritized shutdown of loads/devices is, however, apparently not directly considered in the known publications.

On the basis of this concept, it is true that partial failures in the system can be eliminated or the power consumption in a complete system reduced if, for example, a main power supply source fails and the system has to switch to a replacement power source. However, the known systems do not feature the possibility of providing information about how long an energy resource can be operated at a threshold level or how long a limited energy resource will continue to be available and which functions or devices can be used/supplied with the remaining power in a system and for how long.

SUMMARY OF THE INVENTION

The object of the present invention is therefore to develop a method and equipment of the kind cited, in such a way as to avoid the disadvantages of the state of the art.

The shutdown of devices should, however, only be carried out in exceptional cases, once the maximum possible capacity of a power supply source has been utilized.

Intelligent utilization of the generator limits would, however, reduce the complexity involved for an optimum capacity utilization of the system, since the temperature development would not need to be calculated for each individual device.

This object is solved by a method for the optimized utilization of available energy resources/sources of an electrical system for a vehicle, in particular of a generator system, which includes the following steps:

determining performance parameters $L_{ist}$ (e.g. current I, voltage U, temperature T, power $P_D$ ($P_{verlust}$), PF ($P_{wirk}$), efficiency etc.) of a preferred energy resource of the electrical system;

entering performance parameters $L_{ist}$ (current I, voltage U, temperature T, altitude of the vehicle, etc.) of the energy resource into a thermal model;

comparing at least one performance parameter $L_{ist}$ of the energy resource with a specified performance limit parameter $L_{soll}$ at a specified threshold level of the energy resource;

determining a value for an energy reservoir $E_{Rest}$ of a preferred energy resource-using the one or more identified performance parameters $L_{ist}$ at the threshold level of the energy resource—to maintain an operational state of the vehicle or maintain the current utilization by means of additional energy resources;

and to calculate a remaining time $T_{max}$ depending on the energy reservoir $E_{Rest}$ of a preferred energy resource and using the one or more identified performance parameters $L_{ist}$ to maintain an operational state of the vehicle.

According to one embodiment of the method of the present invention, at least one further energy resource can be additionally be connected to provide support in maintaining an operational state of the vehicle if the preferred energy resource either reaches a critical operational state or has already done so for a specific time or fails.

According to one embodiment of the method of the present invention, performance parameters (e.g. current I, voltage U, temperature T, power $P_D$ ($P_{verlust}$), $P_E$ ($P_{wirk}$), efficiency, etc.) of the connected energy resources are queried from the preferred energy resource to determine their energy reservoir in order to identify the complete capacity utilization of the preferred energy resource.

According to one embodiment of the method of the present invention, the calculation of the remaining time $T_{Max}$ for maintaining an operational state of the vehicle is carried out depending on the utilization by devices of highest priority, which could also be a so called providing (alimentation) priority.

According to another embodiment of the method of the present invention, the calculation of the remaining time $T_{Max}$ for maintaining an operational state of the vehicle is carried out depending on the maximum possible capacity utilization by devices.

According to one embodiment of the method of the present invention, the prioritized disconnecting of devices from the preferred energy resource is carried out when the performance parameter $L_{Ist}$ (actual value) exceeds a specified upper limit $L_{Soll}$ (reference value) of a preferred energy resource and once a critical operational state has been maintained for a specified time period.

According to one embodiment of the method of the present invention, the threshold levels of the energy reservoir of the connected devices are determined in order to carry out a prioritized disconnection of the loads from the energy resource, depending on a critical or normal operational state of the preferred energy resource.

According to one embodiment of the method of the present invention, the thermal model is based on a thermic RC element, for instance built up in a quadripolar circuit which can be in cascade. The electric resistances correspond to the thermic resistances of the individual components of a generator constituting the preferred power source.

The electric capacitors correspond to the equivalent thermic capacitors of the individual components of a generator constituting the preferred power source.

According to one embodiment of the method of the present invention, the priority of a load depends on its safety relevance.

According to one embodiment of the method of the present invention, the priority of a device depends on its power consumption.

According to one embodiment of the method of the present invention, the priority of a load depends on specific aspects of missions.

According to one embodiment of the method of the present invention, the calculation of a remaining time $T_{Max}$ for maintaining an operational state of the vehicle is carried out by means of the thermal model depending on application-specific parameters.

According to one embodiment of the method of the present invention, at least one generator and/or at least one battery will be used for the preferred energy resource/source.

The object of the invention is also achieved with a system for a vehicle for the implementation of the method mentioned above, that includes:
- at least one energy resource which includes at least one generator and/or one battery,
- at least one load as a connected vehicle component,
- a measuring device to determine performance parameters $L_{Ist}$,
- a thermal model to compare and utilize the performance parameters $L_{Ist}$,
- a display unit to display at least one remaining time $T_{Max}$,
- a module or memory unit to store the priorities of the loads,
- a measuring device to measure the temperature of the energy resource/source and/or the loads,
- a switch and control unit as an output survey to connect and disconnect loads,
- an energy source control unit to regulate a terminal voltage U of the energy resources and to connect optionally at least one battery to support the generator(s) or for a system-related/electrical adjustment of energy resources that differ from one another,
- and at least one calculating device for calculating:
  - the energy reservoir $E_{Rest}$ of the energy resources/sources
  - and the remaining time $T_{Max}$.

The invention concerns also an aircraft and/or spacecraft that it is equipped with an electrical system according to the invention.

The invention concerns also an aircraft and/or spacecraft that uses a method according to the invention.

In the following description, a vehicle includes, for example, aircraft, helicopters and spacecraft, HGVs and cars. A load or device includes a piece of equipment, a machine or other appliance that is powered by one or more energy sources. A driver, vehicle driver or pilot is to be understood as the operator of the electrical system of the present invention.

The focus of the invention is in the optimal utilization of an available energy reservoir. To this end, the development or sequence of a parameter (temperature, power, current, voltage, etc.) of the energy resource/source (=generator) as a function of time will be calculated with an appropriate (thermal) model. From the known and identified performance parameters of the generator, a statement can be made as to whether the generator is being operated within a normal operating range or outside of it, in other words at its upper limit, and for how long this has been the case. Additionally, a forecast can be delivered, for instance on when, an operational state is reached.

Depending on the operational state of the generator, further energy resources/sources (battery(-ies)) can be additionally connected if necessary and to support the generator. This can serve different functions, for example to return the generator from a critical power range to its normal operating mode or as a complete replacement for a main energy resource with a finite energy reservoir for a limited time if the generator fails completely but important functions of a vehicle need to be maintained for specific manoeuvres or missions. The question as to which functions, and therefore which devices that provide these functions, are important can be determined using a prioritization by the system and/or the pilot. A prioritized shutdown of devices (loads) has been considered here as a measure to reduce the power consumption of a complete system. This measure would only be applied, however, in the present invention if the upper limits of the preferred energy resource/source had been fully utilized.

From this point of view, it is particularly important for the pilot of a vehicle to know for how long prioritized functions of the vehicle can be sustained if only a limited energy reservoir remains available. This may be the case, for example, if the energy source rapidly declines in power, has already been being operated at full load in a critical range for an extended period or even fails entirely. As a rule, a battery then either takes over the power supply to the system or contributes to it for a limited time as a replacement or supplement to the generator. Determining the residual time, the so-called remaining time, for maintaining an operational state in the case of a limited power supply therefore forms a focus of the invention.

In particular, a simpler system is to be provided which—even in a critical operational state of the system—utilizes the available energy resources in an optimal way and regulates the supplied power in such a way that, even if a power threshold level of a preferred energy resource/source is reached (for a short time), it can be guaranteed that a necessary number of functions for maintaining a chosen or necessary operational state of a vehicle can be provided for a specific time period.

In addition, the system is to be designed in such a way as to convey the information to the vehicle driver as to the period of time for which a specific energy resource can supply power to selected or prioritized devices or which functions can be operated or maintained for how long with the available energy resources and a limited energy reservoir.

An integral aspect of this invention is therefore the fact that, by means of intelligent energy time management, the one or more energy resources/sources available or a networked combination of energy resources, which may comprise, for example, supercaps, generator systems, batteries or fuel cells, can be utilized in an optimized way in order to avoid, if possible, or delay the shutdown of devices/loads.

By identifying characteristic parameters of the utilized energy resources, their operational state can be monitored. If the sum power of the connected energy resources/sources exceeds an admissible level, the following scenarios are conceivable, depending on the situation: The preferred energy resource is operated at its upper limit for a limited time period—that neither interferes with nor damages the safety or operation of the complete system or of the energy source—while maintaining the utilization by the connected devices.

In concrete terms, this means, for example, exceeding the load limits of utilized/preferred energy sources for a defined time period to a defined level (defined, for example, by a temperature) in order to achieve an increased availability of the devices. Only when this limited/defined time period has elapsed, and/or the power of the utilized energy resource drops below a specific level, can either one or several further energy resources be additionally connected, as necessary, likewise for a limited time period in order to maintain a safe operational state for a vehicle.

As an alternative measure, if the upper limits of the available energy resources have been utilized, one or several devices/loads with lower priority can be turned down or shut down, i.e. disconnected from the power supply, until the device/load with higher priority no longer requires this level of power. Here, the priority of the device can be changed/adjusted in such a way that devices that have a higher significance for missions in specific situations are given a higher priority to be supplied with power, in order that, in the case of a lower energy reservoir being available from the utilized energy sources, the mission does not need to be immediately aborted.

An integral aspect of the invention therefore consists in using a system of energy time management in order to, among other things, identify the remaining time for which a limited energy reservoir of one or several energy resources/sources will be available to connected devices with a specific (prioritized) system utilization.

Additional advantages, features and possible applications of the invention result from the following description in connection with the embodiment of a system illustrated in the diagram or the corresponding embodiment of a method.

BRIEF DESCRIPTION OF THE DRAWINGS

FIG. 1 describes an example of a method or system for the optimized utilization of available energy resources/sources in a vehicle, especially in an aircraft; the range of application of the idea of the invention is, however, not limited to this.

DETAILED DESCRIPTION OF THE PREFERRED EMBODIMENTS

In FIG. 1 a power management module 1, by means of an appropriate measuring device 2, defines a number of performance parameters (=status parameters) $L_{Ist}$ of the energy resources/sources 3 connected to the system which may primarily comprise a generator system, DC sources and/or battery systems, and/or of devices/loads 4 connected to the system.

The individual performance parameters $L_{Ist}$, such as temperature (ambient temperature of the energy sources, loads and/or vehicle), current, voltage, frequency, rotation speed, torque of a machine, power consumption/output and capacity for currently stored power, give information about a current operational state and a current energy balance of individual system components.

The system components include, for example, the energy source 3 and, if applicable, the devices/loads 4.

As an additional performance parameter $L_{Ist}$, however, the time T that has elapsed during which the preferred energy source 3 has been operated within a certain load range, can likewise be calculated.

These operational states are stored by means of a status determining device 5 in the form of characteristic values in a memory 6 of the power management module 1 and can be accessed and/or displayed by the system or a pilot for further use at any time, if required.

The identified performance parameters $L_{Ist}$ are applied to a thermal model 7. This thermal model 7 is, in principle, an equivalent electrical circuit diagram of the utilized energy resource/source 3 with which the development of the performance parameters $L_{Ist}$ can be calculated as a function of time. In this way, the time can be predicted as to when critical operational states of the utilized energy resource/source 3 will arise, i.e. when and at which utilization by the connected devices/loads 4 the upper limits of the preferred energy resource(s)/source(s) 3 will be reached or also which energy reservoir (stored energy balance) is available through the utilized energy resource/source 3.

In particular, the power management module 1, while operating an energy source 3 at its upper limits, can calculate the chronological temperature sequence by this energy source 3 in such a way that, on the basis of this information, the exact point in time T can be determined as to when, as a result of the continued heating of the energy source 3, a critical operating value will be reached, i.e. an operating value that is outside its specified upper limit. This can also be achieved when several energy sources 3 are being operated.

The identified point in time T also defines the remaining time as to how long a load state can continue to be maintained. In this way, energy sources 3 can be utilized in an optimal way since they can be specifically operated at their upper limits.

In order for the information to be available to the pilot of the vehicle as to how long a specific utilization can be used by the utilized vehicle components and/or vehicle functions in a situation-specific environment with the available energy resources 3, the data from the thermal model 7 of the preferred energy resource 3 can additionally be linked to the current status data, so-called primary or secondary parameters of the utilized energy resources 3, such as temperature, altitude and speed of the vehicle, in order to calculate the corresponding remaining time $T_{max}$ with a calculation/processing unit 8.

As primary parameters, an altitude, an ambient temperature outside the vehicle and/or the current load of the energy sources 3 could, for example, be considered.

As secondary parameters, the speed of the vehicle can be considered, with which the velocity of flow of a cooling medium such as air in the passive cooling of the energy sources 3 can be considered.

An additional value or parameter could also be the gradient which indicates the increasing/decreasing velocity or the slope of a parameter. If for instance a gradient of a temperature evolution is known, a forecast of when specific working limits of a source are reached.

A detection device, such as a sensor, attached to the energy sources 3 in the case of a failure of the calculation/processing unit 8 can likewise take over the monitoring of the temperature of the energy source(s) 3. If, for example, a generator 9 is used as an energy source 3, the temperature near the generator can be detected. In particular, characteristic data such as the housing, winding and brush temperature can be recorded here.

When using the system of the present invention in an aircraft, it should be noted that the density changes according to the altitude, which automatically has repercussions on the cooling effect and on the temperature of the energy source(s) 3, especially the generator 9. In addition, the altitude causes some limitations to the maximum load permitted. Here the power management module could intervene in order to automatically comply with these limitations and to utilize the available energy resources in an optimal and situation-specific way.

The parameter of the speed of a vehicle, especially in the case of an aircraft, can have an influence on the flow rate of a flowing cooling medium such as air which is directed past energy sources 3 to cool them.

Depending on the kind of application and situation, the remaining time $T_{Max}$ can be interpreted in different ways and have varying significance, as exemplified below but not limited to this example.

For an aircraft, the remaining time $T_{max}$ could be the remaining flight time during which an operational state and a minimum number of functions can be maintained in order, for example, to land the aeroplane safely. This means that the remaining time $T_{Max}$ specifies a time period for which an operational state using vehicle components/devices/loads 4 with highest priority can only just be provided in order to utilize the available energy resources 3, for instance in battery operation.

It is also possible, however, to define the remaining time $T_{Max}$ as the time interval for which the aircraft can be operated with the maximum possible capacity utilization by the connected devices/loads 4 before the preferred energy resource 3 reaches a defined value for a critical operational state. In this case, a further energy resource 3, for example in the form of a battery 10, could then additionally be connected in order to be able to safely ensure the provision of this function/task for a limited period of time. In addition, it may be desired that a defined time period $T_{Max}$ be specified during which a preferred energy resource 3 can be operated at a critical operational state, i.e. at its upper limit, without damaging the system.

A further aspect of the system of the present invention can be found in the fact that the power management module 1, with its energy time management function, additionally has an energy source control unit 11 and can therefore control a terminal voltage U of the active or preferred energy source 3 in such a way that a replacement/supplementary energy source can be connected in such a way that no cross currents flow between the active energy sources 3.

In the case of an error in the power management module, the power management module is deactivated so that a performance can be achieved which corresponds to a system performance without the active power management module 1 (i.e. a so-called fail save operational function). In a concrete situation, this means that, in the case of a fault in the power management module 1, the active supplementary energy source has to be shut down.

The energy source control unit 11 additionally has the function, in the normal operational state of the power management module 1, of ensuring a system-related and/or electrical adjustment of the energy sources that are connected together and differ from one another, such as the generator 9 and battery 10.

A further advantageous aspect can be seen in the fact that, by means of the power management module 1, savings regarding weight and number of components are made possible when it comes to the vehicle's hardware, since additional energy sources can be dispensed with due to the optimum utilization of the available energy sources 3, which are normally built into the vehicle for potential emergencies, i.e. if a main energy source fails.

The calculated remaining time $T_{Max}$ can also, however, be a parameter for how long a replacement energy resource, e.g. a battery 10, is available for selected load profiles if the preferred energy resource 3, e.g. the generator system, fails completely. A possible load profile here is to be understood as the sum of the maximum possible or minimum necessary utilized devices/loads 4 in the system for a particular operational state. Load profiles which can be configured specifically to the situation can be stored in the priority list 12 of the power management module 1 and retrieved when required.

The memory 6 can also contain a list of essential important loads 4, which must be energised all the time, in case that no priority list 12 is available or in case that the power management module 1 fails.

The information as to which devices/loads 4 are used for calculating a remaining time $T_{Max}$ for a required load profile is stored in a priority list 12 of the power management module 1. The priority list 12 assigns individual devices 4 various priorities.

It is also conceivable, however, for the pilot of the vehicle to assign the priorities manually depending on the equipment required for the various mission or load profiles and according to the initial situation and current vehicle status parameters, e.g. altitude, speed, weight of load, etc. which can be considered in the prioritization and in the load profiles. In this way, for example, load or mission profiles for EMS (emergency medial service), VIP (very important persons) or paramilitary/military missions, for example, can be defined, along with load profiles such as for safe landing, for maintaining communication connections, for certain evasive manoeuvres when under fire, or for climatic adversities. Here, the priority of a device 4 may depend on its relevance for safety but also on its power consumption.

If it is known, for example, that only a limited energy reservoir is available from a utilized energy source 3, the system will make a corresponding prioritized decision that only those functions of the complete system will remain available that would allow the aircraft to at least land safely, should an emergency arise.

An additional possibility for preserving the available energy reservoir of the utilized energy source 3, or to bring it out of a critical operational state into a normal operational state, consists in the prioritized shutdown of the loads/devices 4. If it is necessary to ensure that, for example, for a safe manoeuvre of the vehicle, the calculated remaining time $T_{Max}$ will cover a specific maximum load, the calculation unit 8 can, automatically or at the command of the pilot, transmit appropriate commands to the energy control unit 11 to disconnect devices 4 with a lower priority from the network/system for a defined time period, in order to save power.

If more power from the energy sources 3 becomes available again, the disconnected loads 4 can be reconnected to the system. The disconnection of loads 4 may also take place, however, if an output survey module of the switch/control unit 13 determines, on the basis of the current performance parameters of the loads/devices 4, that they are in an abnormal operational state and utilizing more power than it is the case in the normal operational state.

The shutdown or connection of loads 4 to the system is carried out by means of a switch/control unit 13.

A display unit 14 is available to the operator (pilot) to provide various information, such as the current performance parameters of the loads 4, operational states that are relayed by the status determining device 5, a remaining time $T_{Max}$, the prioritized shutdowns, the energy reserves still available and/or further information that could be of use to an operator or pilot.

The power management module 1 is connected to the energy resource 3 via a first communication interface 15. Characteristic data, such as temperature T, voltage U and current I are transmitted to the power management module 1 by this means. The power management module 1 is additionally connected to the switch/control unit 13 and the display unit 14 via a second communication interface 16. The first and second communication interfaces 15, 16 can be, for example, common bus systems that are known in the state of the art.

An additional advantage of the system of the present invention consists in the fact that the network-like interconnection of different energy resources 3 means that the individual energy-specific advantages are brought to bear. This interconnection to a network of quite different energy sources 3 can be controlled by the power management module 1 in this way, e.g. using corresponding, implemented software. The energy balances of the individual energy resources 3 can then be displayed and modelled accordingly, in such a way that the vehicle driver is informed about the status of the available and total energy reservoir at all times.

It is additionally possible to develop the calculation unit 8 in the power management module 1 as a programmatic solution in such a way that the energy balance of the complete system can be updated by the energy balances added when changes in the hardware configuration occur, such as when additional devices 4 and/or energy resources 3 are incorporated. This energy balance can also, under specific conditions, be delivered in real time. A modification of the configuration happens only when other loads/devices 4 or additional sources are integrated/exchanged. A calculation in real time makes sense only when under operational state of the vehicle, the prioritizing of the vehicle's sources is changed. Energy-specific parameters of the individual energy resources 3, which may possibly differ from one another in kind, can be considered in the modelling of the available energy reservoir.

An embodiment of the system to implement the method of the present invention includes:

- at least one energy resource (3) which includes at least one generator (9) and/or one battery (10),
- at least one load (4) as a connected vehicle component,
- a measuring device (2) to determine performance parameters $L_{Ist}$,
- a thermal model (7) to compare and utilize the performance parameters $L_{Ist}$,
- a display unit (14) to display at least one remaining time $T_{Max}$,
- a module or memory unit (6) to store the priorities of the devices (4),
- a measuring device (2) to measure the temperature of the energy resource/source (3) and/or the devices (4).
- a switch and control unit (13) as output survey to connect and disconnect devices (4),
- an energy source control unit (11) to regulate a terminal voltage U of the energy resources (3) and to connect optionally at least one battery (10) to support the generator(s) (9) or for a system-related/electrical adjustment of energy resources that differ from one another,
- and at least one calculating device (8) for calculating:
    the energy reservoir $E_{Rest}$ of the energy resources/sources (3)
    and the remaining time $T_{max}$.

The thermal model 7 could for instance establish the temperature of the windings of a known generator (according an already measured generator), without using a winding sensor in the operational state, and so providing an estimated value of the winding temperature, and deciding with help of the memory unit 6, if the generator is in an abnormal state.

With the time relying information and the calculation unit 8, one can determine the time for which the generator is in his operational state or the time for which the generator remains in his operational state, and also undertake a disconnection of loads 4 according to the priority list 12, with the switching/control unit 13.

Reference List

1—Power management module
2—Measuring device
3—Energy resource or source
4—Device/load
5—Status determining device
6—Memory
7—Thermal model
8—Calculation unit
9—Generator
10—Battery
11—Energy source control unit
12—Priority list
13—Switch/control unit and output survey unit
14—Display unit
15—First communication interface
16—Second communication interface
T—Temperature
U—Electrical voltage
I—Electrical current

What is claimed is:

1. A method for the optimized utilization of at least one of a plurality of available energy resources including a generator of an electrical system in an aircraft, the method being executed on board the aircraft during an operational state of the aircraft, the method comprising:

determining performance parameters $L_{Ist}$ (e.g. current I, voltage U, temperature T, power $P_D$ ($P_{verlust}$), $P_E$ ($P_{wirk}$), efficiency, etc.) of a preferred energy resource connected to the electrical system in the aircraft with a measuring device in electrical communication with the preferred energy resource, wherein the generator is the preferred energy resource;

entering the performance parameters $L_{Ist}$ of the energy resource into a thermal model of a power management module electrically connected in the aircraft between the preferred energy resource and loads;

comparing, by the thermal model, at least one performance parameter $L_{Ist}$ of the energy resource with a specified performance limit parameter $L_{Soll}$ at a specified threshold level of the energy resource;

determining, by a calculating device of the power management module, a value for an energy reservoir $E_{Rest}$ of the energy resource using the one or more identified performance parameters $L_{Ist}$ at the threshold level of the energy resource;

maintaining, by an energy source control unit of the power management module, an operational state of the aircraft or the current utilization by connecting at least one additional one of the available energy resources to the electrical system in the aircraft depending on an operational state of the preferred energy resource based upon the one or more identified performance parameters $L_{Ist}$;

calculating, by the calculating device, a remaining time $T_{Max}$ for maintaining the operational state of the aircraft depending on the energy reservoir $E_{Rest}$ of the energy resource and using the one or more identified performance parameters $L_{Ist}$; and choosing information among current performance parameters of the loads, operational states, the remaining time $T_{Max}$ prioritized shutdowns, and energy reserves available in the aircraft, and displaying the chosen information on a display unit of the aircraft.

2. The method according to claim 1, wherein at least one further energy resource can additionally be connected to the electrical system to help maintain an operational state of the aircraft if the preferred energy resource either reaches a critical operational state or has already done so for a specific time or fails.

3. The method according to claim 1, wherein performance parameters of other energy resources connected to the electrical system are queried from the preferred energy resource to determine its energy reservoir in order to identify the complete capacity utilization of the preferred energy resource in the aircraft.

4. The method according to claim 1, wherein the calculation of the remaining time $T_{Max}$ for maintaining an operational state of the aircraft is carried out depending on the utilization by loads, connected to the electrical system, of highest priority.

5. The method according to claim 1, wherein the calculation of the remaining time $T_{Max}$ for maintaining an operational state of the aircraft is carried out depending on the maximum possible capacity utilization by loads connected to the electrical system.

6. The method according to claim 1, wherein when the performance parameter $L_{Ist}$ (actual value) exceeds a specified upper limit $L_{Soll}$ (reference value) of the preferred energy resource of the aircraft and once a critical operational state has been maintained for a specified time period, the prioritized disconnection of devices from the preferred energy resource is carried out.

7. The method according to claim 1, wherein the threshold levels of the energy reservoir of loads connected to the electrical system are determined in order to carry out a prioritized disconnection of the loads from the preferred energy resource, depending on a critical or normal operational state of the preferred energy resource of the aircraft.

8. The method according to claim 1, wherein the thermal model of the power management module of the aircraft is based on an RC element.

9. The method according to claim 7, wherein the priority of a load connected to the electrical system of the aircraft depends on its safety relevance.

10. The method according to claim 7, wherein the priority of a load connected to the electrical system of the aircraft depends on its power consumption.

11. The method according to claim 1, wherein the calculation of a remaining time $T_{Max}$ for maintaining an operational state of the aircraft is carried out by the thermal model, depending on application-specific parameters to the aircraft.

12. A system in an aircraft for the optimized utilization of at least one of a plurality of available energy resources of an electrical system in the aircraft, the system comprising:

a preferred energy resource in the form of a generator connected to the electrical system in the aircraft and at least one additional energy resource which includes at least battery, at least one load connected to the electrical system in the aircraft, a measuring device to determine performance parameters $L_{Ist}$ of the preferred energy resource, a thermal model of a power management module electrically connected in the aircraft between the preferred energy resource and the at least one load to compare the performance parameters $L_{Ist}$ of the preferred energy resource with a specified performance limit parameter $L_{Soll}$ at a threshold level of the preferred energy resource, a calculating device of the power management module to calculate a value for an energy reservoir $R_{Rest}$ of the preferred energy resource using the performance parameters $L_{Ist}$ of the preferred energy resource at the threshold level of the energy resource;

an energy source control unit of the power management module to maintain an operational state of the aircraft or maintain the current utilization by connecting the at least one additional energy resource to the electrical system depending on an operational state of the preferred energy resource based upon the performance parameters $L_{Ist}$;

the calculating device further configured to calculate a remaining time $T_{Max}$ for maintaining the operational state of the aircraft depending on the energy reservoir $E_{Rest}$ of the preferred energy resource and using the performance parameters $L_{Ist}$;

a display unit to display the remaining time $T_{Max}$ and information chosen among current performance parameters of the at least one load, operational states, prioritized shutdowns, and energy reserves available in the aircraft, a module or memory unit to store the priorities of the at least one load, a measuring device to measure the temperature of the at least one energy resource and/or the at least one load, a switch and control unit as an output survey to connect and disconnect the at least one load, and the energy source control unit further configured to regulate a terminal voltage U of the at least one energy resource and to connect optionally at least one battery to support the preferred energy resource or for a system-related/electrical adjustment of energy resources that differ from one another.

13. The system of claim 12 wherein the aircraft is a helicopter or a spacecraft.

14. The method according to claim 1, wherein the aircraft is a helicopter or a spacecraft.

15. The system of claim 12, wherein the energy source control unit is further configured to connect at least one additional energy resource to the electrical system to help maintain an operational state of the aircraft when the preferred energy resource either reaches a critical operational state or has already done so for a specific time or fails.

* * * * *